United States Patent [19]

Yamanaka et al.

[11] 4,183,052
[45] Jan. 8, 1980

[54] SOLID STATE COLOR CAMERA

[75] Inventors: Seisuke Yamanaka, Mitaka; Fumio Nagumo, Yokohama; Toshimichi Nishimura, Tama, all of Japan

[73] Assignee: Sony Corporation, Tokyo, Japan

[21] Appl. No.: 794,804

[22] Filed: May 9, 1977

[30] Foreign Application Priority Data

May 14, 1976 [JP] Japan .................. 51/55059

[51] Int. Cl.² ........................................ H04N 9/09
[52] U.S. Cl. ............................................. 358/50
[58] Field of Search .......... 358/41, 44, 47, 43, 358/50, 11, 16, 52

[56] References Cited

U.S. PATENT DOCUMENTS

| | | | |
|---|---|---|---|
| 2,924,648 | 2/1960 | Luther | 358/16 |
| 3,801,884 | 4/1974 | Sequin | 358/213 |
| 3,975,760 | 8/1976 | Yamanaka et al. | 358/41 |
| 4,007,488 | 2/1977 | Morishita et al. | 358/213 |
| 4,016,598 | 4/1977 | Yamanaka | 358/41 |

Primary Examiner—John C. Martin
Attorney, Agent, or Firm—Hill, Van Santen, Steadman, Chiara & Simpson

[57] ABSTRACT

A solid state color camera having an image sensing device which has a plurality of image sensing cells aligned in both the horizontal and vertical directions, an optical filter which produces three primary color separated images on the image sensing device, a circuit which reads out an image signal as to satisfy an interlaced signal reading system of a standard television signal, the image signal being comprised of a luminance signal and a chrominance modulated carrier signal, a circuit which supplies a carrier signal to the reading out circuit, the carrier signal being selected approximately equal to or half of a standard color sub-carrier frequency, and a circuit selecting vertical and horizontal frequencies of a read out image signal.

12 Claims, 26 Drawing Figures

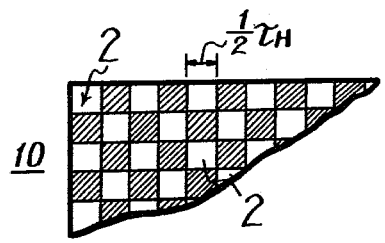
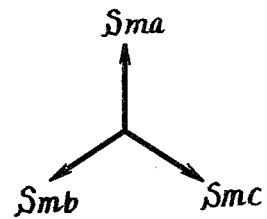
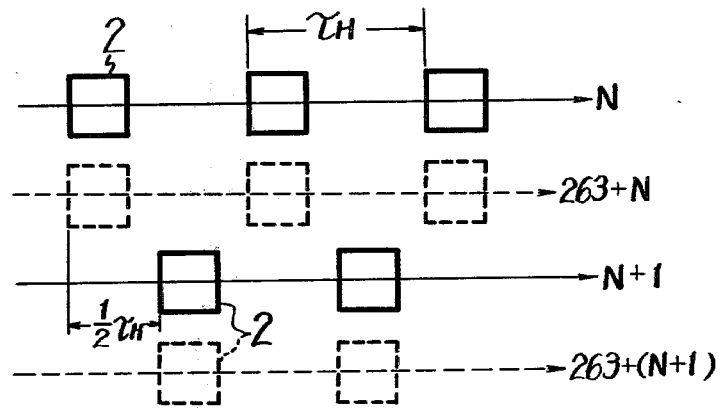
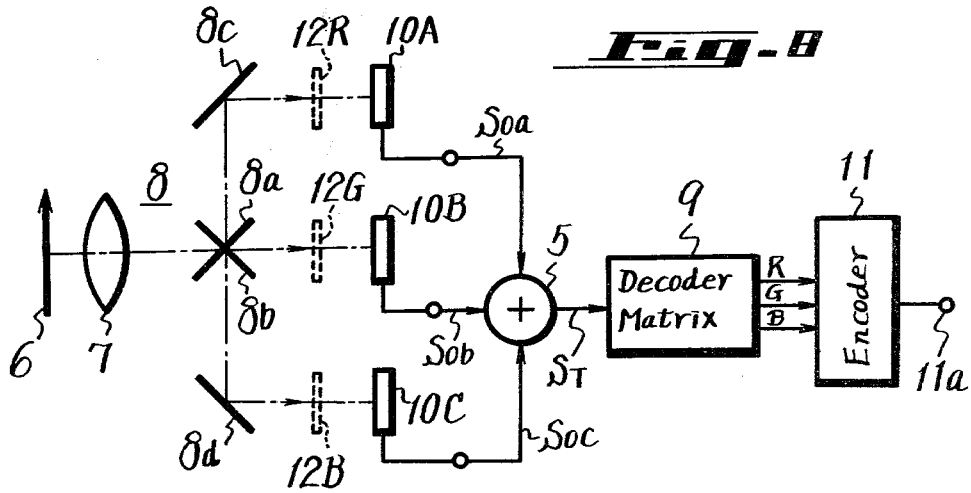

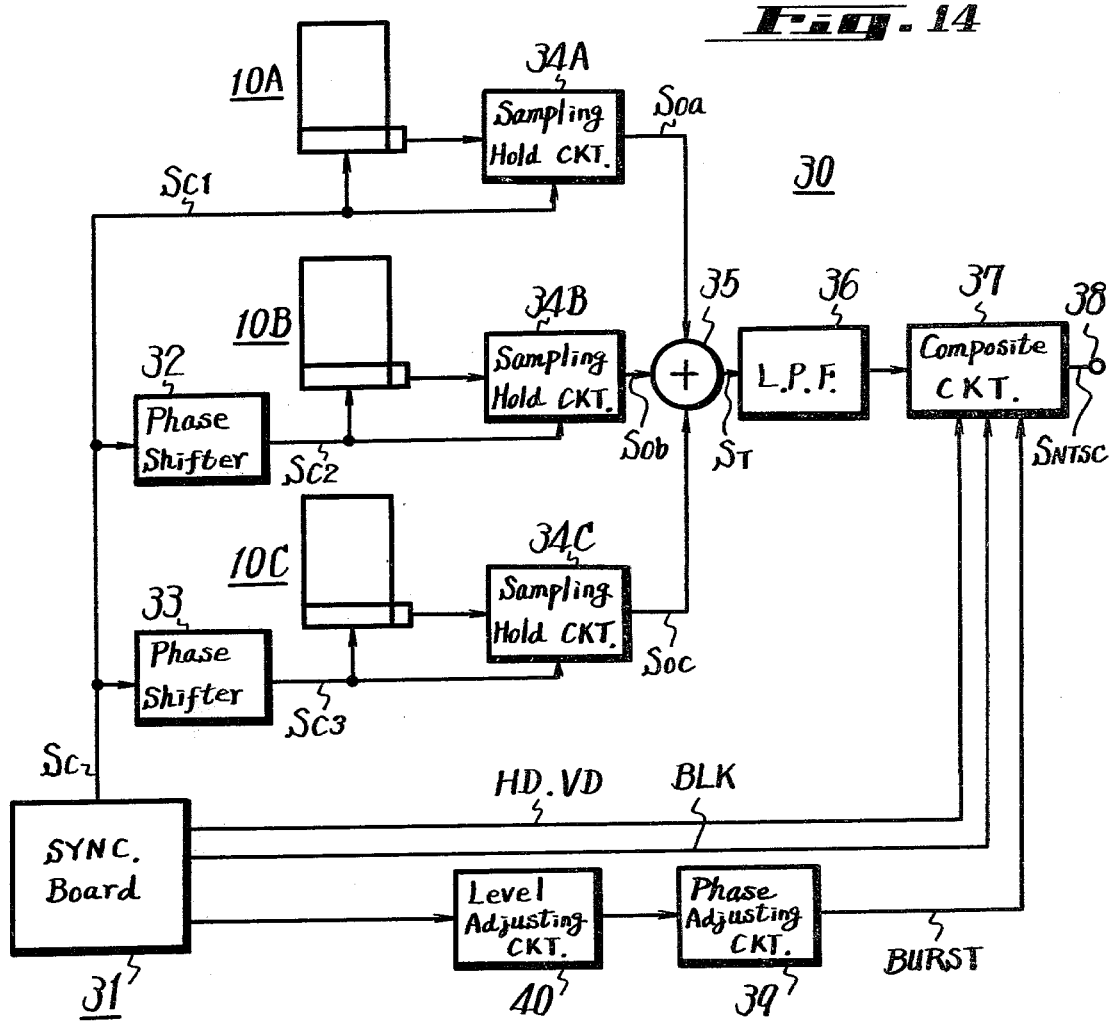
Fig. 14
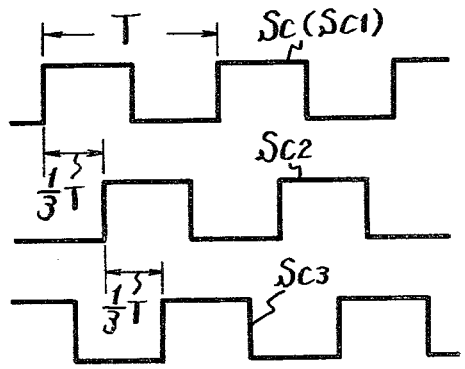
Fig. 15A
Fig. 15B
Fig. 15C

SOLID STATE COLOR CAMERA

FIELD OF THE INVENTION AND PRIOR ART

1. Field of the Invention

This invention generally relates to a solid state color camera using a solid state image sensor such as a charge coupled device, and is directed more particularly to a solid state color camera using a solid state image sensor from which a color video signal satisfying a color video (picked up) signal of the Quasi-NTSC system is obtained.

2. Description of the Prior Art

In the art, when a charge coupled device (which will be referred hereinafter to simply as CCD) is used as a solid state image sensor, the CCD is usually constructed as shown in FIG. 1. The solid state image sensor 10 shown in the figure is of the type of a frame (or field) transfer system. In FIG. 1, 1A designates an image sensing array on which an image of an object to be picked up is projected and which consists of a plurality of image sensing cells 2 (serving as picture elements) arranged in the row and column direction, 1B designates a temporary storage array which is substantially same as the image sensing array 1A in construction except that it is shielded optically and stores carriers corresponding to the light image of the object and transferred from the sensing array 1A at the positions corresponding to those of the array 1A, 1C designates a horizontal shift register which reads out the information carriers of one H (where H represents one horizontal scanning period) from the array 1B, and 3 designates an output terminal led out from the horizontal shift register 1C, respectively. Further, 4 indicates channel stoppers which are formed to be extended to the carrier transfer direction.

FIG. 2 is a schematic diagram which conceptionally illustrates the image sensing cells 2 of the image sensing array 1A in view of the center of image sensing cells. As shown in FIG. 2, plural image sensing cells 2 are arranged in the horizontal and vertical scanning directions parallel with one another. In FIG. 2, $\tau_H$ indicates the arranging pitch of the cells 2 in the horizontal direction. Further, the arrangement of the cells 2 in FIG. 2 is the case of an interlaced image taking system. The image sensing cells 2 shown by solid lines in FIG. 2 are used in odd fields, while the cells 2 shown by dotted lines in the figure are used in even fields.

The CCD 10 with the arrangement of cells 2 as shown in FIG. 2 is conventionally called as a parallel-aligned CCD. A CCD whose arrangement of image sensing cells is, for example, checker-board pattern can be also used as the solid state image sensor of this system.

FIG. 3 shows a part of one example of the checker-pattern CCDs, in which areas of each image sensing cell 2 are optically shielded by $\frac{1}{2}$ pitch ($\frac{1}{2}\tau_H$) as shown by the hatched portions in FIG. 3 and the optically shielded areas are arranged alternately to make the output signals of adjacent lines in opposite phase condition.

FIG. 4 shows a part of FIG. 3, which illustrates the image sensing cell portion in enlarged scale conceptionally.

Before describing a solid state camera using the above CCD, a problem caused by using the above CCD as a solid state camera will be now described.

Figure 5:
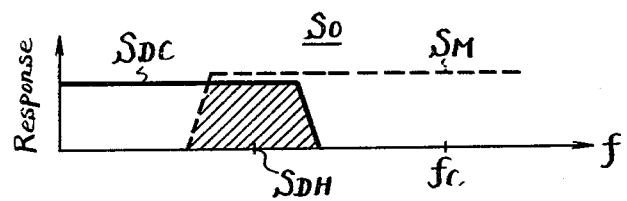

Since the input light informations corresponding to the image of an object are converted to electric signals under such a state that they are sampled at every image sensing cell, a picked up signal $S_O$ includes a side band component (AC component) $S_M$ in addition to a base band component or modulated component (DC component) $S_{DC}$ which will become a luminance signal, as shown in FIG. 5. In this case, a part of the side band component is overlapped on a high band portion of the modulated component $S_{DC}$ to cause a aliasing noise $S_{DH}$. Thus, the quality of a reproduced picture is deteriorated. The "aliasing noise" is defined as follows:

The lower side band components of a sampled image signal are spread out evenly onto the high frequency region of the base-band components of the image signal. This superimposed region of the base-band components will cause a noise known as an "aliasing noise". Thus, the base-band component is the modulated component (DC component) which will become the luminance signal (see FIG. 5).

BACKGROUND OF THE INVENTION

It is, however, possible to eliminate the aliasing noise by suitably selecting the band width of the modulated component $S_{DC}$ and the fundamental transfer frequency (sampling frequency) $f_C$ ($=1/\tau_H$), but this means that the band width of the modulated component $S_{DC}$ must be selected to be narrow. If the band width of modulated component $S_{DC}$ is selected, for example, about 3.5 MHz as in the ordinary case, the number $N_H$ of image sensing cells in the horizontal scanning direction must be increased because the transfer frequency $f_C$ is selected high as the band width of modulated component $S_{DC}$ is widened. Thus, the above methods are not practical.

Figure 6:
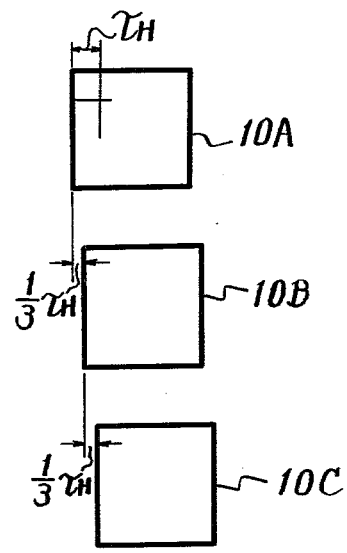

Accordingly, a solid state camera free from the above problem will be now described. In such an example, as shown in FIG. 6, three CCDs 10A, 10B and 10C are used. In this case, three CCDs 10A, 10B and 10C are relatively displaced by $\frac{1}{3}\tau_H$ with one another in view of space. Thus, if the side band components derived from the CCDs 10A, 10B and 10C are taken as $S_{ma}$, $S_{mb}$ and $S_{mc}$, respectively, and the read-out timing or time relation upon reading out signals from the CCDs 10A, 10B and 10C is selected to satisfy the phase difference of 120°, the phase difference between the adjacent side band components $S_{ma}$, $S_{mb}$ and $S_{mc}$ becomes 120° as shown in FIG. 7. Thus, as shown in FIG. 8, if picked up output signals $S_{oa}$, $S_{ob}$ and $S_{oc}$ from the CCDs 10A, 10B and 10C which satisfy the above time relation are supplied to an adding circuit 5, the adding circuit 5 produces a picked up signal $S_T$ in which the side band components $S_{ma}$, $S_{mb}$ and $S_{mc}$ are cancelled and hence there is no aliasing error. The solid state camera shown in FIG. 8 is disclosed in the U.S. Pat. No. 3,975,760, so that detailed description will be omitted. But, in FIG. 8, 6 denotes an object to be picked up, 7 an optical system, and 8 a spectroscopic system which includes, for example, half mirrors 8a, 8b and mirrors 8c, 8d. Further, 12R, 12G and 12B designate color optical filters located at the front of the CCDs 10A, 10B and 10C, 9 a matrix (decoder) circuit which is supplied with the picked up signal $S_T$ from the adding circuit 5, and 11 an encoder which is supplied with the output signal from the matrix circuit 9 and produces a color picked up (video) signal satisfying the NTSC system to be delivered to an output terminal 11a.

If the camera is constructed as shown in FIG. 8, the aliasing noise can be eliminated and hence the deterioration of picture quality caused by the aliasing noise can be avoided.

By using plural CCDs, the number $N_H$ of image sensing cells of each CCD can be decreased.

In order to obtain a desired color picked-up signal of the NTSC system at the output terminal 11a of the camera shown in FIG. 8, it is necessary to supply the composite picked-up signal $S_T$ from the adding circuit 5 to the decoder 9 and to carry out the conversion processing of the signal without failure.

In order to obtain the picked-up signal $S_T$ itself as a color picked-up (video) signal $S_{NTSC}$ of the NTSC system (this system will be hereinafter called as a direct NTSC system), the following conditions (I) and (II) must be at least satisfied.

(I)
$$S_{NTSC} = S_Y + S_C \tag{1}$$
$$S_Y = 0.30 E_R + 0.59 E_G + 0.11 E_B \tag{2}$$
$$S_C = \frac{R-Y}{1.14} \cos 2\pi \cdot f_s \cdot t + \frac{B-Y}{2.03} \sin 2\pi \cdot f_s \cdot t \tag{3}$$

(II)
$$f_S = \frac{455}{2} f_H \tag{4}$$
$$f_H = \frac{525}{2} f_V \tag{5}$$

where
$E_R$, $E_G$ and $E_B$ : R (red), G (green) and B (blue) color signals
$f_S$ : frequency of color sub-carrier
$f_H$ : horizontal scanning frequency
$f_V$ : vertical scanning frequency The condition (I) can be satisfied by suitably selecting, for example, the spectroscopic system and demodulating system, and the condition (II) can be satisfied by selecting, for example, the frequency of the transfer signal $S_C$, which will be fed to the horizontal shift register 1C of the CCD 10, as the frequency $f_S(=3.579545$ MHz) of the color sub-carrier.

That is, since the input light informations corresponding to the image of the object are converted to the electric signals under such a state that they are sampled at every image sensing cell, the chrominance component in the picked-up output signal $S_T$ from the CCDs 10A, 10B and 10C is obtained as a carrier chrominance signal. Further, if the transfer frequency is selected as the color sub-carrier frequency, the carrier frequency of the carrier chrominance signal becomes the transfer frequency or color sub-carrier frequency to satisfy the above conditions (I) and (II). As a result, even if the encoder 11 is not used, the color video signal of the NTSC system can be obtained finally.

By the way, if the camera is constructed to satisfy the condition (II), the spatial arrangement of image sensing cells differs from the arrangement of image sensing cells in the reproduced state, and in the arrangement of reproduced image sensing cells the arrangement becomes different at every field and every frame. As a result, a flicker appears in a reproduced picture.

Figure 9A:
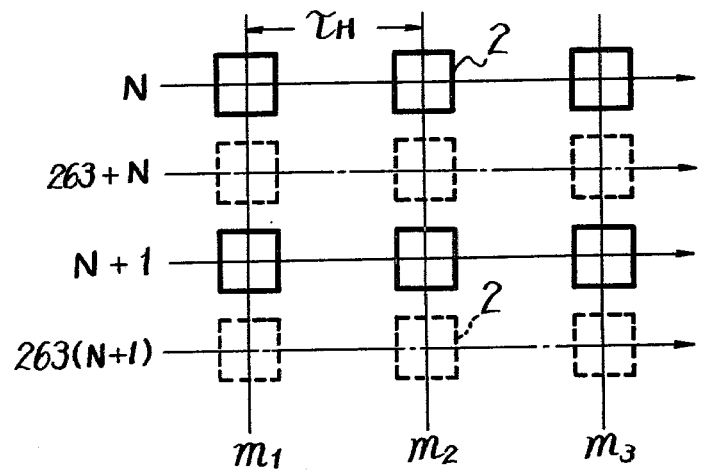
Figure 9B:
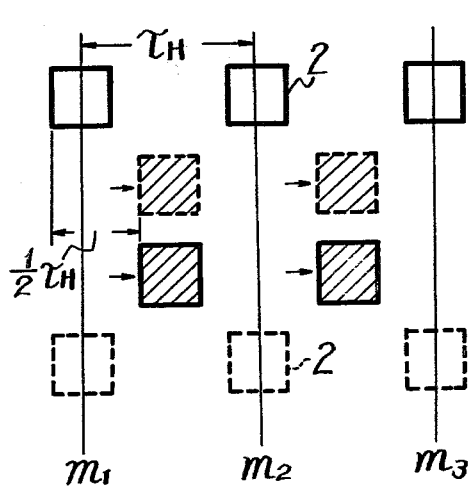
Figure 9C:
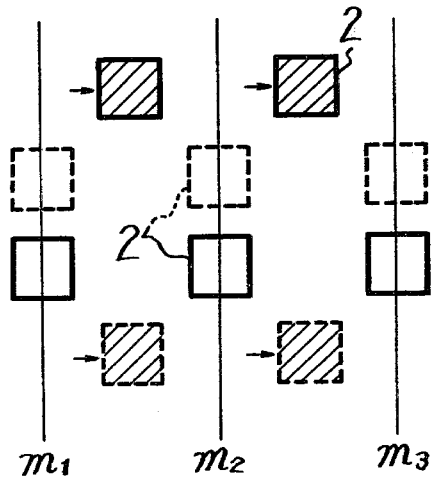

The above flicker phenomenon will be described in a case of the parallel-aligned CCD. FIG. 9A shows the spatial arrangement of image sensing cells 2 at the picking up portion of a CCD, and FIGS. 9B and 9C show the arrangements of reproduced image sensing cells 2, respectively.

The number $N_H$ of image sensing cells in the horizontal scanning direction in one horizontal scanning period $T_H$ is expressed as follows.

$$N_H = f_S \cdot T_H \tag{6}$$

Therefore, the displacement of the arrangement of the reproduced cells from the spacial arrangement of the cells can be obtained by the equations (6) and (4).

That is, the cell arrangement at a certain field is sufficient to consider the arrangement of the final cell of previous line.

If an odd field at an odd frame is taken as a reference of consideration, the number of image sensing cells in N lines is given as follows.

$$N \cdot N_H = N \cdot f_S \cdot T_H \tag{7}$$

Since the following equation (8) is established
$$f_H = 1/T_H \tag{8}$$

the equation (7) can be expressed as follows.

$$N \cdot N_H = \frac{455}{2} \cdot f_H \cdot T_H \cdot N \tag{9}$$
$$= \frac{455}{2} N$$

Thus, if the number N is an odd number or since the first line of this field is N=1, the equation (9) can be rewritten as follows.

$$1 \times N_H = \frac{455}{2} \tag{10}$$
$$= l + \frac{1}{2}$$

where l is an integer.

In general, if the reading order which corresponds to a television scanning is taken into consideration, the final image sensing cell and the first cell in the following (N+1) line are arranged apart from each other by $\tau_H$ in view of space similar to the other cell arrangements. Therefore, $\frac{1}{2}$ in the equation (10) means that the first cell in the next (second) line is displaced from the reference time of the horizontal scanning period $T_H$ by $\frac{1}{2}\tau_H$. That is, the cells between the N and N+1 lines are relatively displaced by $\frac{1}{2}\tau_H$.

Accordingly, at the odd field in the odd frame, a movement or displacement of $\frac{1}{2}\tau_H$ of reproduced cells appears between the N line (odd line) and N+1 line (even line) as shown in FIG. 9B.

Next, an even field in an odd frame is now considered. In this case, since 264th line becomes the first line, the number of image sensing cells between the lines 263 and 264 can be calculated similar to the equation (9), as follows.

$$263 \cdot N_H = 263 \times \frac{455}{2} \cdot f_H \cdot T_H$$
$$= \frac{1}{2} \times 263 \times 455$$
$$= m + \frac{1}{2} \tag{10'}$$

where m is an integer. Thus, the reproduced image sensing cells move by $\frac{1}{2}\tau_H$.

In the case of the even field, different from the odd field, the reproduced image sensing cells of only the odd line move, which is shown in FIG. 9B by dotted lines.

In the case of an even frame, the reproduced image sensing cells opposite to those of the odd frame move on the respective fields, which is shown in FIG. 9C.

That is, in the even frame, the reproduced cells on the odd lines of the odd field move, while the reproduced cells on the even lines of the even field move.

As may be apparent from the comparison of FIGS. 9B and 9C, the movement of the reproduced cells occur between the odd and even frames and there is a period of every two frame.

When the arrangement of the reproduced cells is moved at every field and every frame as described above, there are caused flickers and jitters and hence a reproduced picture becomes discomfortable for a viewer.

Figure 10A:
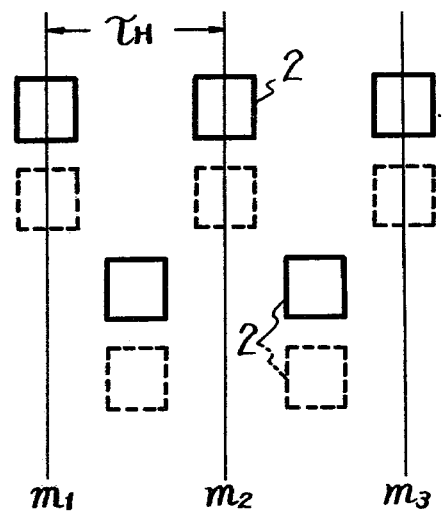
Figure 10B:
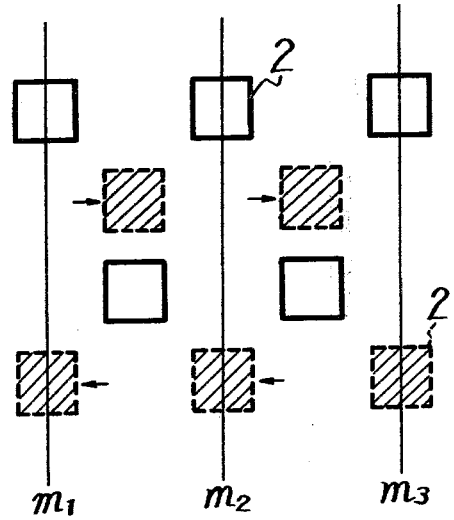
Figure 10C:
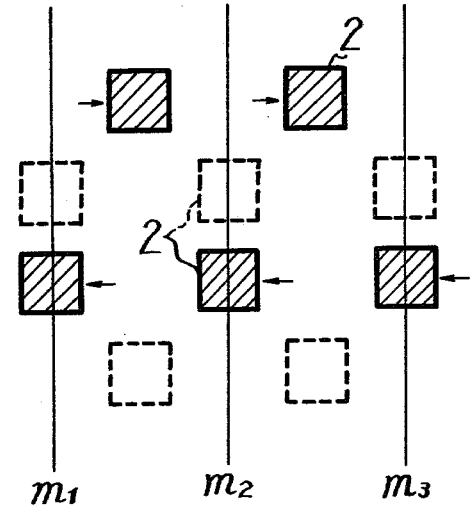

When a checkered-pattern of a CCD is used as the CCD of the solid state camera, the similar phenomenon will be caused (refer to FIGS. 10A, 10B and 10C). In this case, however, the movement of the reproduced image sensing cells appears in only one field in either of the odd and even frames.

OBJECTS AND SUMMARY OF THE INVENTION

Accordingly, it is an object of the present invention to provide a solid state color camera free from the defects of the prior art caused by the movement of reproduced image sensing cells in the direct NTSC system.

It is another object of the invention to provide a solid state color camera which is simple in construction but free from the defect inherent to the prior art.

It is a further object of the invention to provide a solid state color camera which produces a color video signal of the Quasi-NTSC system without using an encoder and further without separating the luminance and chrominance components.

According to an aspect of the present invention there is provided a solid state color camera which comprises an image sensing device having a plurality of image sensing elements aligned in both horizontal and vertical directions, an optical filter for providing three primary color separated images on the image sensing device, a circuit for reading out an image signal as to satisfy an interlaced signal reading system of a standard television signal, said image signal being comprised of a luminance signal and a carrier modulated chrominance signal, a circuit for supplying a carrier signal to the reading out circuit, said carrier signal being selected approximately equal to or half of a standard color sub-carrier frequency, and a circuit for selecting vertical and horizontal frequencies of a read-out image signal.

The other objects, features and advantages of the present invention will become apparent from the following description taken in conjunction with the accompanying drawing through which like references designate like elements.

BRIEF DESCRIPTION OF THE INVENTION

Figure 1:
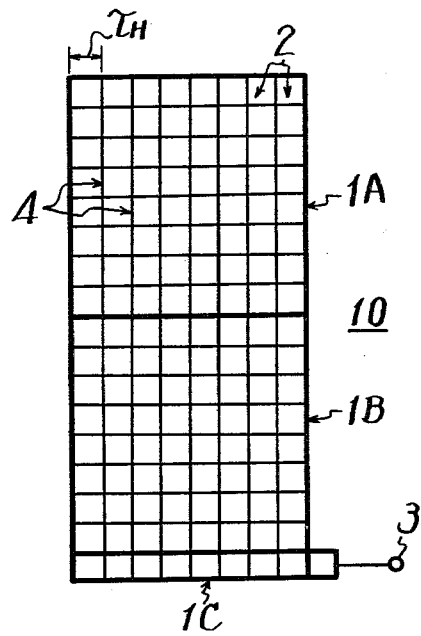
Figure 2:
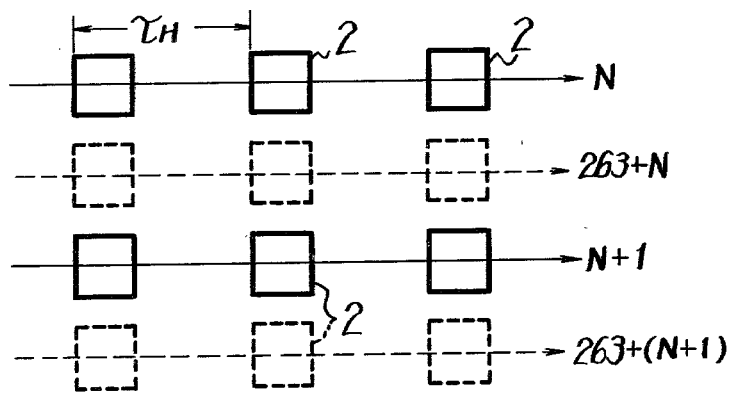
Figure 13:
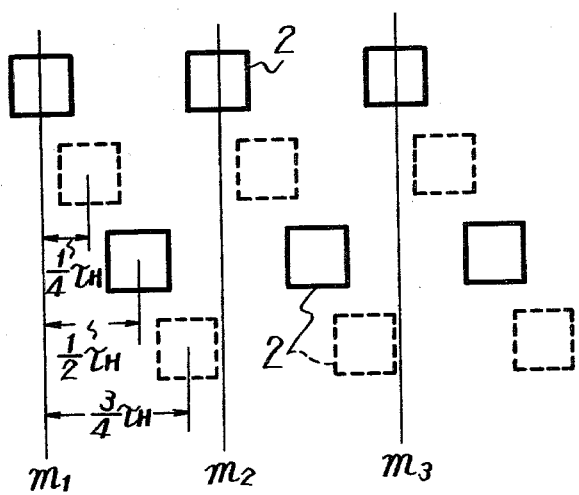
Figure 16:
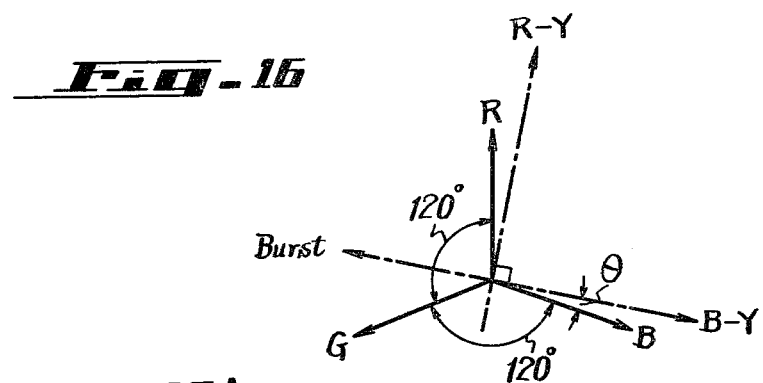
Figure 17A:
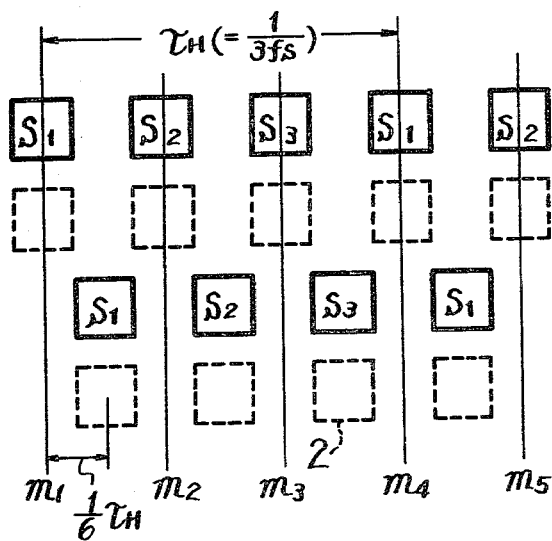
Figure 17B:
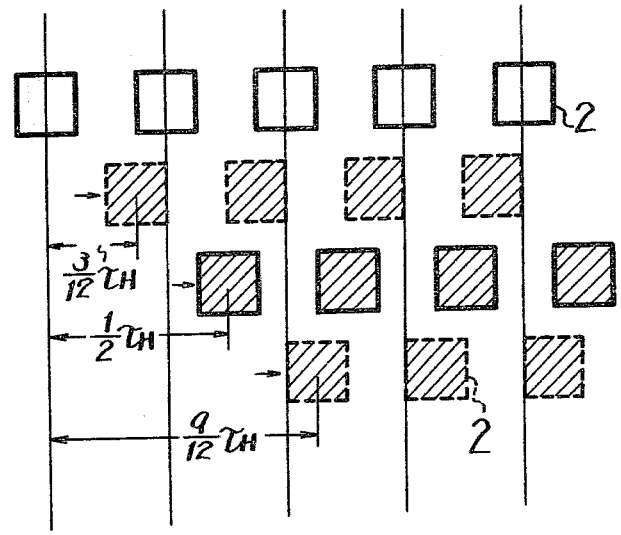

FIG. 1 is a schematic diagram showing a solid state image sensor used for explaining the present invention;

FIG. 2 is a part of FIG. 1, in enlarged scale, showing an arranging pattern of imaging sensing cells of the sensor shown in FIG. 1;

FIG. 3 is a schematic diagram showing a part of another solid state image sensor;

FIG. 4 is a part of FIG. 3, in enlarged scale, showing an arranging pattern of image sensing cells of the sensor shown in FIG. 3;

FIG. 5 is a frequency spectrum diagram of an output signal from the image sensor;

FIG. 6 is a schematic diagram showing a spatial arranging relation of plural solid state image sensors;

FIG. 7 is a phasor diagram showing the phase relation of side band components;

FIG. 8 is a systematic diagram showing an example of a prior art solid state camera;

FIGS. 9A, 9B, 9C and 10A, 10B, 10C are diagrams used for explaining the operation of the solid state camera shown in FIG. 8;

FIGS. 11A, 11B and 12A, 12B are diagrams used for explaining the present invention;

FIG. 13 is a diagram showing an arranging pattern of image sensing cells of a CCD which can be employed in the invention;

FIG. 14 is an electrical and systematic circuit diagram showing an example of the solid state color camera according to the invention;

FIGS. 15A–15C and 16 are waveform diagrams used for explaining the operation of the camera of the invention shown in FIG. 14; and FIGS. 17A and 17B are schematic diagrams showing a CCD which can be used in the invention.

DESCRIPTION OF THE PREFERRED EMBODIMENTS

The present invention will be hereinafter described with reference to FIG. 11 and following figures. In this invention, at least the phase of $f_S$ expressed by the equation (4) is repeated at the frame period, and accordingly the color sub-carrier frequency (sub-carrier) $f_S$, which is used as the transfer frequency $f_C$, is determined by the following equation (11).

$$f_S = \left( \frac{455}{2} \pm \frac{2I+1}{2 \times 525} \right) F_H \quad (11)$$

where $$I = 0, 1, 2, \ldots \quad (12)$$
$$F_H = f_H$$
$$F_H = \frac{525}{2} f_V$$

or $$F_H = f_{H'}, f_{H'} = \frac{525}{2} f_{V'} \quad (13)$$

In the case that $F_H$ is same as the horizontal scanning frequency $f_H$ as in the equation (12), the sub-carrier $f_S$ differs from the prior art somewhat. In such a case, however, the term I in the equation (11) is so selected that the frequency of a shifted sub-carrier $f_S$ is within a synchronized capture range of the APC (automatic phase control) circuit at a receiver or preferably within a broadcasting standard. In general, even if the frequency of the shifted sub-carrier $f_S$ differs by about a range of 10 Hz and 200 Hz from the normalized value, the synchronization is not disturbed.

In the case of the equation (13), the respective values are selected within at least the synchronized capture range. In general, there will occur no problem even when $f_H$ is shifted by about ±200 Hz and $f_V$ about ± several Hz, respectively.

The following description is on the case of the equation (12), and the consideration is given on the case whether it is a multiple of 525 by an integer (M) or not, namely, the following cases.

A. $2I+1 \neq 525M$

B. $2I+1 = 525M$ where M is an integer.

Firstly, in the case of items A, in order to facilitate the explanation, the following condition is assumed.

$$2I + 1 = 1$$
$$f_S = \left(\frac{455}{2} + \frac{1}{2 \times 525}\right) f_H \quad (14)$$

Thus, the following equation (15) is established on the even field in an odd frame.

$$263 \cdot N_H = 263 \times \left(\frac{455}{2} + \frac{1}{2 \times 525}\right) f_H \cdot T_H \quad (15)$$
$$= \frac{263 \times 455}{2} + \frac{263}{2 \times 525}$$
$$= \left(m + \frac{1}{2}\right) + \frac{1}{4}$$
$$= m + \frac{3}{4}$$

where
$$\frac{263 \times 455}{2} = m + \frac{1}{2} \quad (m \text{ being an integer})$$
$$\frac{263}{2 \times 525} \simeq \frac{1}{4}$$

From the above equation (15) it will be apparent that the image sensing cells are reproduced under being moved by $\frac{3}{4}\tau_H$ in the even field.

Figure 11A:
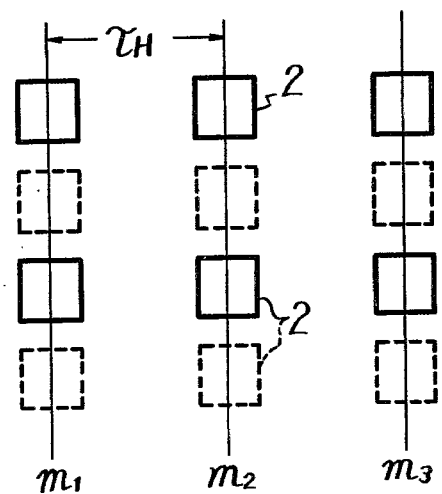
Figure 11B:
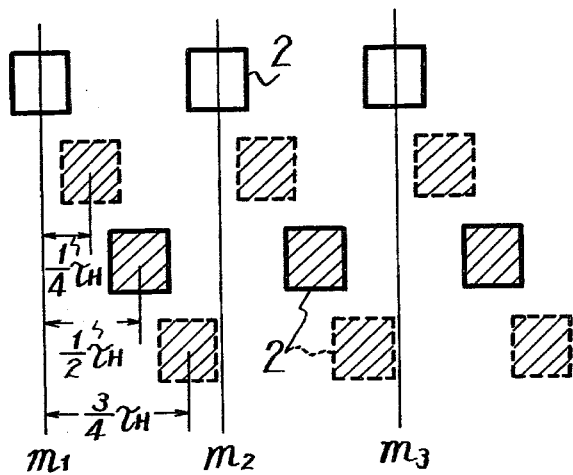

Though not described, in the odd field only the image sensing cells on the even line are moved by $\frac{1}{4}\tau_H$ similar to the prior art, so that the arrangement of reproduced cells becomes as shown in FIG. 11B.

The reproduced cells on the even line of an even field is expressed by the following equation (16) if N=264.

$$264 \cdot N_H = 264 \times \left(\frac{455}{2} + \frac{1}{2 \times 525}\right) \quad (16)$$
$$= m + \frac{1}{4} \quad (m \text{ being an integer})$$

Thus, on the even line the reproduced cells move by $\frac{1}{4}\tau_H$ as shown in FIG. 11B.

Next, an even frame will be now considered, since the reproduced cells are expressed by the following equation (17), the reproduced cells do not move on the first line.

$$525 \cdot N_H = 525 \left(\frac{455}{2} + \frac{1}{2 \times 525}\right) \quad (17)$$
$$= \left(m + \frac{1}{2}\right) + \frac{1}{2}$$
$$= m + 1 \quad (m \text{ being an integer})$$

Also, the reproduced cells on the next line are expressed by the following equation (18), so that on the next line the reproduced cells move by $\frac{1}{2}\tau_H$.

$$526 \cdot N_H = 526 \left(\frac{455}{2} + \frac{1}{2 \times 525}\right) \quad (18)$$
$$= m + \frac{1}{2}$$

In an even field, the cells on the first line are given by the following equation (19), $$(525 + 263) N_H = \frac{788 \times 455}{2} + \frac{788}{2 \times 525}$$
$$\div m + \frac{3}{4} \quad (19)$$

so that the reproduced cells move by $\frac{3}{4}\tau_H$ on the first line.

The cells on the next line are given by the following equation (20), $$(525 + 264) N_H = \frac{789 \times 455}{2} + \frac{789}{2 \times 525}$$
$$\div \left(m + \frac{1}{2}\right) + \frac{3}{4}$$

so that the reproduced cells move by $\frac{3}{4}\tau_H$.

Thus, according to the present invention the reproduced image sensing cells move in the even frame same as in the odd frame, hence no movement of cells occurs between the fields, but the movement of cells between the frames can be eliminated positively. In other words, when the transfer frequency is selected as in the present invention, the phase of the transfer signal is finished at a frame unit.

Figure 12A:
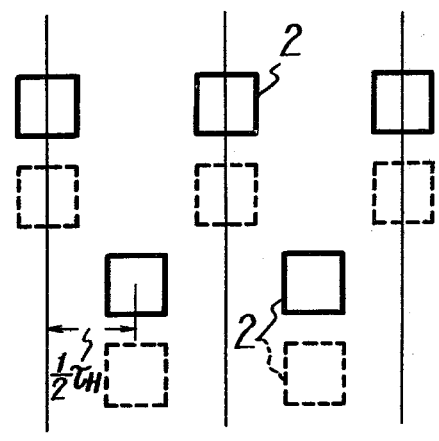
Figure 12B:
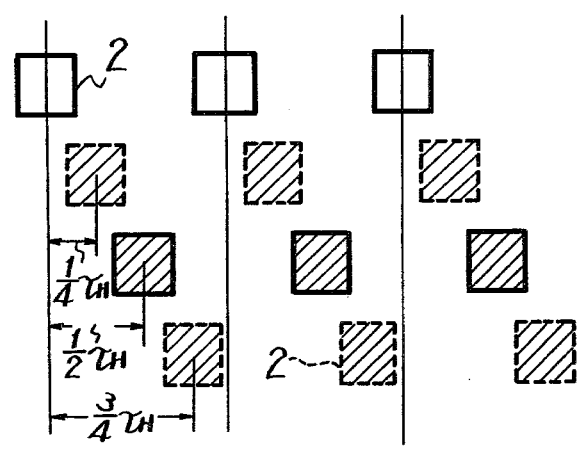

In the case where the CCD of a checker-pattern is used, since image sensing cells are previously shifted by $\frac{1}{2}\tau_H$ between the adjacent lines as shown in FIG. 12A, the reproduced cells are not moved on an odd field but the reproduced cells are moved on only even field as shown in FIG. 12B. Therefore, it will be easily understood that if the CCD of a checker-pattern is employed, the reproduced cells are moved less as compared to the CCD of a parallel-aligned pattern and hence a reproduced picture becomes more stable.

If the spatial arrangement of image sensing cells is selected to be the same as the arrangement of reproduced cells and accordingly a CCD, which has the cell arrangement shown in FIG. 13 (this type of a CCD will be hereinafter called as a modified checker-pattern CCD), is used, the movement of reproduced cell becomes zero. Thus, the bad influence caused by the movement of reproduced cells is eliminated. When the modified checker-pattern type CCD is formed practically, a diode array or the like is most preferred.

As described above, if the term (2I+1) of the equation (11) is selected to satisfy the above condition A, it will be apparent that an aimed purpose can be attained.

Next, the above condition (I) will be described briefly.

In the spectroscopic system, in order to satisfy the following conditions (a) and (b)

(a) the level ratio of R, G and B signals forming the luminance signal in the NTSC system satisfies the equation (2), and (b) the side band components become the color difference signal of the equation (3)

the levels of output signals from the respective CCDs 10A, 10B and 10C must be equal one another, so that the spectroscopic characteristics of the color filters 12R, 12G and 12B must be selected to satisfy the above conditions.

In this case, if the color filters of single color light permeable or transmitting type shown in FIG. 8 are used, none of the above conditions can be satisfied. But it is sufficient to employ the following spectroscopic characteristics.

At first, it is assumed that the relation between the output signals $S_{oa}$, $S_{ob}$ and $S_{oc}$ from the CCDs 10A, 10B, 10C and R, G, B is expressed as follows.

$$\begin{bmatrix} S_{oa} \\ S_{ob} \\ S_{oc} \end{bmatrix} = \begin{bmatrix} r_1 & g_1 & b_1 \\ r_2 & g_2 & b_2 \\ r_3 & g_3 & b_3 \end{bmatrix} \begin{bmatrix} R \\ G \\ B \end{bmatrix} \quad (21)$$

In the above equation (21), in order to satisfy the above conditions (a) and (b), while not describing the detailed explanation, it is sufficient that the constants of $r_1$ to $b_3$ are selected to be, for example, as follows.

$$\begin{bmatrix} r_1 & g_1 & b_1 \\ r_2 & g_2 & b_2 \\ r_3 & g_3 & b_3 \end{bmatrix} = \begin{bmatrix} 0.2028 & 0.1305 & 0.0000 \\ 0.0423 & 0.2911 & 0.0000 \\ 0.0549 & 0.1684 & 0.1100 \end{bmatrix} \quad (22)$$

From the equation (22), the levels $E_R$, $E_G$, $E_B$ of output signals R, G, B become as follows.

$$\left. \begin{array}{l} E_R = (r_1 + r_2 + r_3)R = 0.3000 \\ E_G = (g_1 + g_2 + g_3)G = 0.5900 \\ E_B = (b_1 + b_2 + b_3)B = 0.1100 \end{array} \right\} \quad (23)$$

Thus, the condition (a) is satisfied.

Since the output signals $S_{oa}$, $S_{ob}$ and $S_{oc}$ from the respective CCDs 10A, 10B and 10C are expressed by the following equation (24)

$$\left. \begin{array}{l} S_{oa} = r_1 R + g_1 G = 0.3333 \\ S_{ob} = r_2 R + g_2 G = 0.3334 \\ S_{oc} = r_3 R + g_3 G + b_3 B = 0.3333 \end{array} \right\} \quad (24)$$

(where $R = G = B = 1$)

the above condition (b) is the color difference signal. Accordingly, the filtering characteristics of the color filters 12R, 12G, 12B which are disposed in front of the CCDs 10A, 10B and 10C are determined to satisfy the equation (22).

A solid state color camera of the present invention, which satisfies the above conditions (I) and (II), will be described with reference to FIG. 14 which is its schematic diagram.

In FIG. 14, 30 generally designates the solid state color camera of the invention. The respective horizontal shift registers of three CCDs 10A, 10B and 10C of the camera 30 are supplied with the transfer signal $S_C$ obtained at a synchronizing board 31. In this case, as described previously, the frequency $f_S$ of the transfer signal $S_C$ is selected as follows.

$$f_S = f_C = \left( \frac{455}{2} + \frac{1}{2 \times 525} \right) f_H \quad (25)$$
$$= 3.579560 \text{ (MHz)}$$

It may be easily understood from the above description that the CCDs 10B and 10C are supplied with transfer signals $S_{C2}$ and $S_{C3}$ (refer to FIGS. 15A–15C) which are shifted in phase by $\frac{2}{3}\pi$ and $4/3\,\pi$ from the transfer signal $S_C$ ($S_{C1}$ hereinafter) supplied to the CCD 10A by phase shifters 32 and 33. Thus, the output signals $S_{oa}$, $S_{ob}$ and $S_{oc}$ are alternately and successively derived from the respective CCDs 10A, 10B and 10C under being shifted in view of time and then fed through sampling hold circuits 34A, 34B and 34C to an adding circuit 35 to be added or composed as a composite signal $S_T$.

The composite signal $S_T$ is supplied to a low pass filter 36 to be limited within a desired band (about 4.5 MHz), and thereafter to a composite circuit 37 which is supplied with various synchronizing signals so as to produce a well known composite color video signal $S_{NTSC}$. That is, a blanking pulse signal BLK, synchronizing signals VD, HD and burst signals BURST obtained from the synchronizing board 31 are supplied to the composite circuit 37.

The phase of the burst signal BURST is selected as follows. In case of demodulating the carrier chrominance signal in the side of a receiver, its demodulating axis is R-Y axis and B-Y axis, but it is necessary that the color signal demodulated with these demodulating axis satisfies the condition of the NTSC system or the equation (3). To this end, R-Y and B-Y axes are selected as shown in FIG. 16. An angle $\theta$ shown in FIG. 16 can be determined, for example, as follows.

$$\theta = 12.4° \quad (26a)$$

The demodulated output signal (color signal) $S_d$ in the case of the equation (26a) is expressed by the following equation (26b).

$$S_\alpha = 0.245 A \left\{ \frac{R-Y}{1.14} \cos 2\pi \cdot f_S \cdot t + \frac{B-Y}{2.03} \sin 2\pi \cdot f_S \cdot t \right\} \quad (26b)$$

In the equation (26b), A represents the output gain ratio of the side band component $S_M$ to the modulated output component $S_{DC}$ so that, as the demodulated output signal $S_\alpha$ of the NTSC system, only the factor 0.245 A is different. However, the factor 0.245 A can be made coincident with that of the NTSC system by utilizing the operation of the ACC (automatic color control) circuit of the receiver.

If the phase of the burst signal is selected to satisfy the equation (26a) as shown in FIG. 16, the color difference signal can be demodulated. To this end, as shown in FIG. 14, there are provided a level adjusting circuit 40 connected to the output side of the synchronizing board 31 and a phase adjusting circuit 39 connected between the level adjusting circuit 40 and the composite circuit 37, respectively.

If the optical characteristics and transfer signal are selected as described above, the solid state color camera of the direct NTSC system can be made and also a reproduced picture from the video signal therefrom is free from any flicker.

By the way, the above description is given on only the case of $(2I+1 \neq 525M)$, but it is of course possible in the case of $(2I+1=525M)$ or the above condition B that the phase of transfer frequency $f_C$ is repeated at every frame. Though its detailed explanation will be omitted, if in the following equation (27)

$$f_S = (455/2 \pm M/2) F_H \quad (27)$$

M is an even number, a fraction of $\frac{1}{2}$ appears in the term of $F_H$. Thus, M must be an odd integer ($\therefore M = 2M' + 1$, M' being an arbitrary integer).

Therefore, the equation (27) is rewritten as follows.

$$f_S = \left(\frac{455}{2} \pm \frac{2M'+1}{2}\right) F_H \quad (28)$$

$$\therefore f_S = \left\{(m+\tfrac{1}{2}) \pm (M'+\tfrac{1}{2})\right\} F_H$$
$$= M'' F_H$$

where $M''$ is integer.

In this case, $F_H$ must be different from $f_H$ and the tolerance range of the former is determined as follows.

$$\left.\begin{array}{l} F_H = f_H \pm \Delta f_H \\ \Delta f_H = 200\ H_z \end{array}\right\} \quad (29)$$

Further, the transfer frequency $f_C$ is selected for example, within $f_S \pm$ several ten $H_z$.

Since $M=1$, $M''=228$ (or 227). Therefore, in this case, if $F_H$ is selected as 15.69975 $H_z$ (15.7689 $H_z$), the purpose can be achieved without changing the frequency $f_S$. In other cases, the respective values can be selected suitably.

Under the equation (28), regardless of whether $M''$ is an even or odd figure, it can be satisified and hence there is no movement of reproduced image sensing cells. Therefore, it will be apparent that a CCD of parallel-aligned type is preferred.

The foregoing description is given on the case that the carrier frequency of a color difference signal in the repeating frequency or $f_C = f_S$. It is, however, possible that even if, for example, the transfer frequency $f_C$ is selected as $\tfrac{1}{2} f_S$ and its frequency where the second high harmonic ($=f_S$) is obtained is selected as the carrier frequency to produce the color difference signal, the purpose can be achieved.

In this case, however, since the transfer frequency $f_C$ itself resides in the band of the luminance component, it is necessary to eliminate the fundamental side band components produced about the frequency $f_C$. Therefore, in the case where the above system is employed, the signal processing system is necessary to cancel the above side band component by utilizing the vertical correlation.

As described above, if $f_C = \tfrac{1}{2} f_S$ is used, the frequency $f_C$ is expressed as follows $$f_C = \tfrac{1}{2} M'' F_H \quad (30)$$

Thus, if $M''$ is an odd figure, it is sufficient that the circuit is formed so as to reverse the phase of the transfer frequency $f_C$ at every frame. In this case, the movement of reproduced image sensing cells becomes as shown in FIG. 11B, so that the CCD of a checker-pattern is preferred.

As another example of the case that $M''$ is an odd figure, it is possible that the equation (30) is modified as the equation (11).

When $M'' = 2M''' + 1$ ($M'''$ is an integer), the following equation (31) is obtained.

$$f_C = \tfrac{1}{2} f_S = \left(\frac{2M'''+1}{1} \pm \frac{2I+1}{2 \times 525}\right) F_H \quad (31)$$

With this system, the reproduced image sensing cells are moved as shown in FIG. 11B, so that the CCD of a modified checker-pattern is preferred but the CCD of a checker-pattern can be used without any trouble.

In case of $M''$ being an even figure, though its detailed explanation is omitted, it is sufficient to employ the transfer signal whose phase is reversed at every 1H and every frame and a CCD similar to that of the above example can be used.

As described above, according to the present invention, the frequency of the transfer signal is selected very near the color sub-carrier frequency, so that various defects of the direct NTSC system inherent to the prior art can be avoided.

Accordingly, in the present invention signal processing circuits such as an encoder can be omitted to simplify the circuit construction, but the deterioration of a picture quality is avoided effectively.

The above description is given for the case where three CCDs are used to form the solid state color camera, but it is not necessary that the number of CCDs used in the invention be limited to three. For example, one CCD is possible to form the solid state color camera.

FIG. 17A shows the case of the invention where a single CCD is used. In this case, the R, G and B color signals are provided by a single CCD, so that three image sensing cells $S_1$, $S_2$ and $S_3$ of those 2 make a unit as shown in FIG. 17A.

The case of FIG. 17A is the case where a CCD of a checker-pattern is used. When the CCD is formed to satisfy the above conditions, the arrangement of reproduced image sensing cells becomes as shown in FIG. 17B. The CCD shown in FIG. 17A can achieve sufficiently the purpose of the present invention.

It may be apparent that many modifications and variations could be effected by one skilled in the art without departing from the spirits or scope of the novel concepts of the present invention, so that the scope of the invention should be determined by the appended claims only.

We claim as our invention:
1. A solid state color camera, comprising:
   (a) solid state image sensing device means having a plurality of image sensing elements aligned both in horizontal and vertical directions;
   (b) filter means for providing three primary color separated images on said image sensing device means;
   (c) means for reading out directly an image signal as to satisfy an interlaced signal reading system of a standard broadcast television signal, said image signal being comprised of a luminance signal and a chrominance modulated carrier signal;
   (d) means for supplying a carrier signal having no modulating components to said reading-out means, said carrier signal being selected approximately equal to a standard color sub-carrier frequency; and
   (e) means for selecting vertical and horizontal frequencies of a read-out image signal.
2. A solid state color camera as claimed in claim 1, wherein said carrier signal is selected to satisfy the following equation:

$$f_S = \left(\frac{455}{2} \pm \frac{2I+1}{2 \times 525}\right) \times F_H$$

where I is 0, 1, 2, ..., $f_S$ is selected as said carrier signal, and $F_H$ is newly selected as a horizontal frequency.

3. A solid state color camera as claimed in claim 2, wherein said image sensing device means includes three chips of CCD imaging devices, said filter means of three primary colors are respectively disposed in the light path of each of said CCD imaging devices, and outputs of said CCD imaging devices are mixed to derive said image signal.

4. A solid state color camera as claimed in claim 3, wherein light transmitting characteristics of each of said filter means are determined for said luminance signal to satisfy color ratios of a luminance component of a standard composite color television signal.

5. A solid state color camera comprising:
(a) solid state image sensing device means having a plurality of image sensing elements aligned both in horizontal and vertical directions;
(b) filter means for providing three primary color separated images on said image sensing device means;
(c) means for reading out directly an image signal as to satisfy an interlaced signal reading system of a standard broadcast television signal, said image signal being comprised of a luminance signal and a chrominance modulated carrier signal;
(d) means for supplying a carrier signal having no modulating components to said reading-out means, said carrier signal being selected approximately equal to one-half of a standard color sub-carrier frequency; and
(e) means for selecting vertical and horizontal frequencies of a read-out image signal.

6. A solid state color camera comprising:
(a) solid state image sensing device means having a plurality of image sensing elements aligned both in a horizontal and a vertical direction;
(b) color filter means for providing three primary color separated images on said image sensing device means;
(c) means for displaying an image simultaneously on each of said image sensing device means through respective ones of said color filters;
(d) means for reading out an image signal in accordance with the requirements of an interlaced signal reading system of a standard NTSC television signal, said image signal being comprised of a luminance signal and a chrominance modulated carrier signal;
(e) means for supplying a carrier signal to said reading-out means, said carrier signal being selected to be approximately equal to a standard NTSC color sub-carrier frequency; and
(f) means for selecting vertical and horizontal frequencies of a read-out image signal.

7. A solid state color camera comprising:
(a) solid state image sensing device means having a plurality of image sensing elements aligned both in a horizontal and a vertical direction;
(b) color filter means for providing three primary color separated images on said image sensing device means;
(c) means for displaying an image simultaneously on each of said image sensing device means through respective ones of said color filters;
(d) means for reading out an image signal in accordance with the requirements of an interlaced signal reading system of a standard NTSC television signal, said image signal being comprised of a luminance signal and a chrominance modulated carrier signal;
(e) means for supplying a carrier signal to said reading-out means, said carrier signal being selected to be approximately equal to one-half a standard NTSC color sub-carrier frequency; and
(f) means for selecting vertical and horizontal frequencies of a read-out image signal.

8. A solid state color camera, comprising:
(a) solid state image sensing device means having a plurality of image sensing elements aligned both in horizontal and vertical directions;
(b) filter means for providing three primary color separated images on said image sensing device means;
(c) means for reading out directly an image signal as to satisfy an interlaced signal reading system of a standard broadcast television signal, said image signal being comprised of a luminance signal and a chrominance modulated carrier signal;
(d) means for supplying a carrier signal having no modulating components to said reading-out means; said carrier signal being selected approximately equal to a standard color sub-carrier frequency;
(e) means for selecting vertical and horizontal frequencies of a read-out image signal;
(f) said carrier signal being selected to satisfy the following equation:

$$f_S = \left( \frac{455}{2} \pm \frac{2I + 1}{2 \times 525} \right) \times F_H$$

where I is 0, 1, 2, ..., $f_S$ is selected as said carrier signal, and $F_H$ is newly selected as a horizontal frequency.

9. A solid state color camera comprising:
(a) solid state image sensing device means having a plurality of image sensing elements aligned both in horizontal and vertical directions;
(b) filter means for providing three primary color separated image on said image sensing device means;
(c) means for reading out directly an image signal as to satisfy an interlaced signal reading system of a standard broadcast television signal, said image signal being comprised of a luminance signal and a chrominance modulated carrier signal;
(d) means for supplying a carrier signal having no modulating components to said reading-out means, said carrier signal being selected approximately equal to one-half of a standard color sub-carrier frequency;
(e) means for selecting vertical and horizontal frequencies of a read-out image signal;
(f) said carrier signal being selected to satisfy the following equation:

$$f_S = \left( \frac{455}{2} \pm \frac{2I + 1}{2 \times 525} \right) \times F_H$$

where I is 0, 1, 2, ..., $f_S$ is selected as said carrier signal, and $F_H$ is newly selected as a horizontal frequency.

10. A solid state color camera as claimed in claim 9, wherein said image sensing device means includes three chips of CCD imaging devices, said filter means of three primary colors are respectively disposed in the light path of each of said CCD imaging devices, and outputs of said CCD imaging devices are mixed to derive said image signal.

11. A solid state color camera as claimed in claim 10, wherein light transmitting characteristics of each of said filter means are determined for said luminance signal to satisfy color ratios of a luminance component of a standard composite color television signal.

12. A solid state color camera, comprising:
(a) solid state image sensing device means having a plurality of image sensing elements aligned both in horizontal and vertical directions;
(b) filter means for providing three primary color separated images on said image sensing device means;
(c) means for reading out directly an image signal as to satisfy an interlaced signal reading system of a television signal, said image signal being comprised of a luminance signal and a chrominance modulated carrier signal;
(d) means for supplying a carrier signal having no modulating components to said reading-out means; and
(e) means for selecting vertical and horizontal frequencies of a read-out image signal.

* * * * *